(12) United States Patent
Frey et al.

(10) Patent No.: US 7,143,106 B2
(45) Date of Patent: Nov. 28, 2006

(54) RECLAIMING RESOURCES IN RESPONSE TO FORCED STATE TRANSITIONS

(75) Inventors: Jeffrey A. Frey, New Paltz, NY (US); Stephen J. Kinder, Hyde Park, NY (US); Matthew J. Sykes, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 408 days.

(21) Appl. No.: 10/254,106

(22) Filed: Sep. 24, 2002

(65) Prior Publication Data

US 2004/0059749 A1    Mar. 25, 2004

(51) Int. Cl.
*G06F 17/30* (2006.01)
*G06F 15/16* (2006.01)

(52) U.S. Cl. .................. 707/103; 707/100; 707/104.1; 709/223; 709/225

(58) Field of Classification Search ............... 707/10, 707/100, 103, 104.1; 709/223, 225; 710/33; 713/107, 150; 714/13; 717/108, 130, 147; 719/315, 321, 328
See application file for complete search history.

(56) References Cited

U.S. PATENT DOCUMENTS

| | | | |
|---|---|---|---|
| 5,560,022 A * | 9/1996 | Dunstan et al. | 713/300 |
| 5,768,510 A | 6/1998 | Gish | 395/200.33 |
| 5,848,246 A | 12/1998 | Gish | 395/200.58 |
| 5,901,315 A | 5/1999 | Edwards et al. | 395/704 |
| 5,966,530 A * | 10/1999 | Shen et al. | 712/244 |
| 5,987,245 A | 11/1999 | Gish | 395/680 |
| 5,999,972 A | 12/1999 | Gish | 709/219 |
| 6,029,000 A * | 2/2000 | Woolsey et al. | 717/147 |
| 6,038,562 A | 3/2000 | Anjur et al. | 707/10 |
| 6,038,590 A | 3/2000 | Gish | 709/203 |
| 6,052,711 A | 4/2000 | Gish | 709/203 |
| 6,115,719 A * | 9/2000 | Purdy et al. | 707/103 R |
| 6,151,700 A | 11/2000 | Fox | 717/3 |
| 6,233,620 B1 | 5/2001 | Gish | 709/203 |
| 6,253,282 B1 | 6/2001 | Gish | 711/113 |
| 6,266,666 B1 | 7/2001 | Ireland et al. | 707/10 |
| 6,266,709 B1 | 7/2001 | Gish | 709/315 |
| 6,266,716 B1 * | 7/2001 | Wilson et al. | 710/33 |
| 6,266,788 B1 | 7/2001 | Othmer et al. | 714/38 |
| 6,272,555 B1 | 8/2001 | Gish | 709/315 |
| 6,272,556 B1 | 8/2001 | Gish | 709/315 |
| 6,272,673 B1 | 8/2001 | Dale et al. | 717/1 |
| 6,286,028 B1 | 9/2001 | Cohen et al. | 709/202 |
| 6,289,395 B1 * | 9/2001 | Apte et al. | 719/318 |
| 6,567,809 B1 * | 5/2003 | Santosuosso | 707/10 |
| 6,754,659 B1 * | 6/2004 | Sarkar et al. | 707/10 |
| 2001/0049686 A1 * | 12/2001 | Nelson et al. | 707/103 X |

(Continued)

OTHER PUBLICATIONS

Monson-Haefel, "Enterprise JavaBeans," 1999, O'Reilly & Associates, Inc., 1st Edition, vi, xi, xii, 5, 9, 47, 48, 49, 50, 51, 53, 161, 162, 170, 171, 172.*

(Continued)

*Primary Examiner*—Jeffrey Gaffin
*Assistant Examiner*—Hassan Mahmoudi
(74) *Attorney, Agent, or Firm*—John Campbell; Heslin Rothenberg Farley & Mesiti P.C.

(57) ABSTRACT

Resources used by components are aggressively reclaimed, in order to enable those resources to be available to other components. To aggressively reclaim one or more resources of a component, the component is forced to transition from one state to a reclaim state, and at the reclaim state, the resources are reclaimed, if necessary.

12 Claims, 6 Drawing Sheets

U.S. PATENT DOCUMENTS

| | | | |
|---|---|---|---|
| 2002/0040409 A1* | 4/2002 | Matena et al. | 709/315 |
| 2002/0087687 A1* | 7/2002 | Zaifman et al. | 709/225 |
| 2003/0056022 A1* | 3/2003 | Carlson et al. | 709/315 |
| 2003/0056028 A1* | 3/2003 | Underwood et al. | 709/328 |
| 2003/0061399 A1* | 3/2003 | Wagener et al. | 709/321 |
| 2003/0212987 A1* | 11/2003 | Demuth et al. | 717/130 |
| 2004/0024854 A1* | 2/2004 | Mandal | 709/223 |

OTHER PUBLICATIONS

"Connection Strategies in EntityBeans", P. Malani, Java Report, vol. 6, No. 4, p. 52-4, 56-7, Apr. 2001 (Abstract Only).

"Understanding the Behavior of Java Programs", T. Systa, Proceedings Seventh Working Conference on Reverse Engineering, p. 214-223, 2000 (Abstract Only).

"Monitoring Software Components and Component-Based Software", J. Gao, E.Y. Zhu, S. Shim, Lee Chang, Proceedings 24th Annual International Computer Software and Applications Conference, p. 403-412, 2002 (Abstract Only).

"UML Collaboration Diagrams and Their Transformation to Java", G. Engels, R. Hucking, S. Sauer, A. Wagner; "UML" '99—Unified Modeling Language. Beyond the Standard. Second International Conference (Lecture Notes in Computer Science vol. 1723) p. 473-488; 1999 (Abstract Only).

"On the Relationships Between Static and Dynamic Models in Reverse Engineering Java Software", T. Systa, Sixth Working Conference on Reverse Engineering (Cat. No. PR00303) p. 304-313, 1999 (Abstract Only).

"A Reverse Engineering Approach for Software Testing of Object-Oriented Programs", D. Kung, Hsia Pei, Proceedings 1999 IEEE Symposium on Application-Specific Systems and Software Engineering and Technology. ASSET '99 (Cat. No. PR00122) p. 42-49, 1999 (Abstract Only).

"Generating Java Code From the Dynamic Model Based on Object Modeling Technique", J. Ali, J. Tanaka, Transactions of the Information Processing Society of Japan, vol. 39, No. 11, p. 3084-3096, Nov. 1998 (Abstract Only).

"Serving Up Beans to the Enterprise", M. Swainston-Rainford, Application Development Advisor, vol. 2, No. 3, p. 59-61, Jan.-Feb. 1999 (Abstract Only).

* cited by examiner

RECLAIMING RESOURCES IN RESPONSE TO FORCED STATE TRANSITIONS

TECHNICAL FIELD

This invention relates, in general, to the reclaiming of resources, and in particular, to reclaiming resources, in response to forced state transitions of the components associated with the resources.

BACKGROUND OF THE INVENTION

Resources used by components, such as Enterprise Java components, are reclaimed in order to enable those resources to be available to other components. Examples of such resources are connections, which represent one or more access channels to physical resources owned by or outside of a server, such as the J2EE server. These connections are used by the componentry to access back-end resource managers, like a relational database manager, message broker or legacy application server. An open connection represents various levels of resource consumption, like open sockets, virtual storage consumption, etc. If the componentry improperly or inefficiently manages the resources, then the system will suffer resource exhaustion, availability problems and/or performance problems, etc.

Previously, time-outs and garbage collection techniques have been employed by servers to address this problem. However, these solutions result in a delay in resource reclamation, and depending on the type of connection, and the amount of resources consumed by the unused open connection, may result in server interruption or performance problems, as well as intermittent failures, which may be difficult to debug.

Thus, a need still exists for improved capabilities to manage reclamation of resources, such as connections.

SUMMARY OF THE INVENTION

The shortcomings of the prior art are overcome and additional advantages are provided through the provision of a method of reclaiming resources. The method includes, for instance, forcing a component to transition from a state to a reclaim state to reclaim one or more resources associated with the component; and reclaiming at least one resource of the one or more resources, in response to the forced transition.

System and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, a reclamation capability is provided, in which a component (e.g., an instance of a component) is forced to transition from one state to another state, referred to herein as a reclaim state, in order to reclaim one or more resources associated with the component.

As one example, the components are Enterprise Java components of a J2EE environment, which can be implemented on various platforms, such as z/OS, AIX or Websphere, executing on different types of systems, such as Z series (e.g., 390 systems), X series (e.g., RS/6000), I series (e.g., Intel) or P series (e.g., AS/400) systems, offered by International Business Machines Corporation, Armonk, N.Y.

Figure 1:
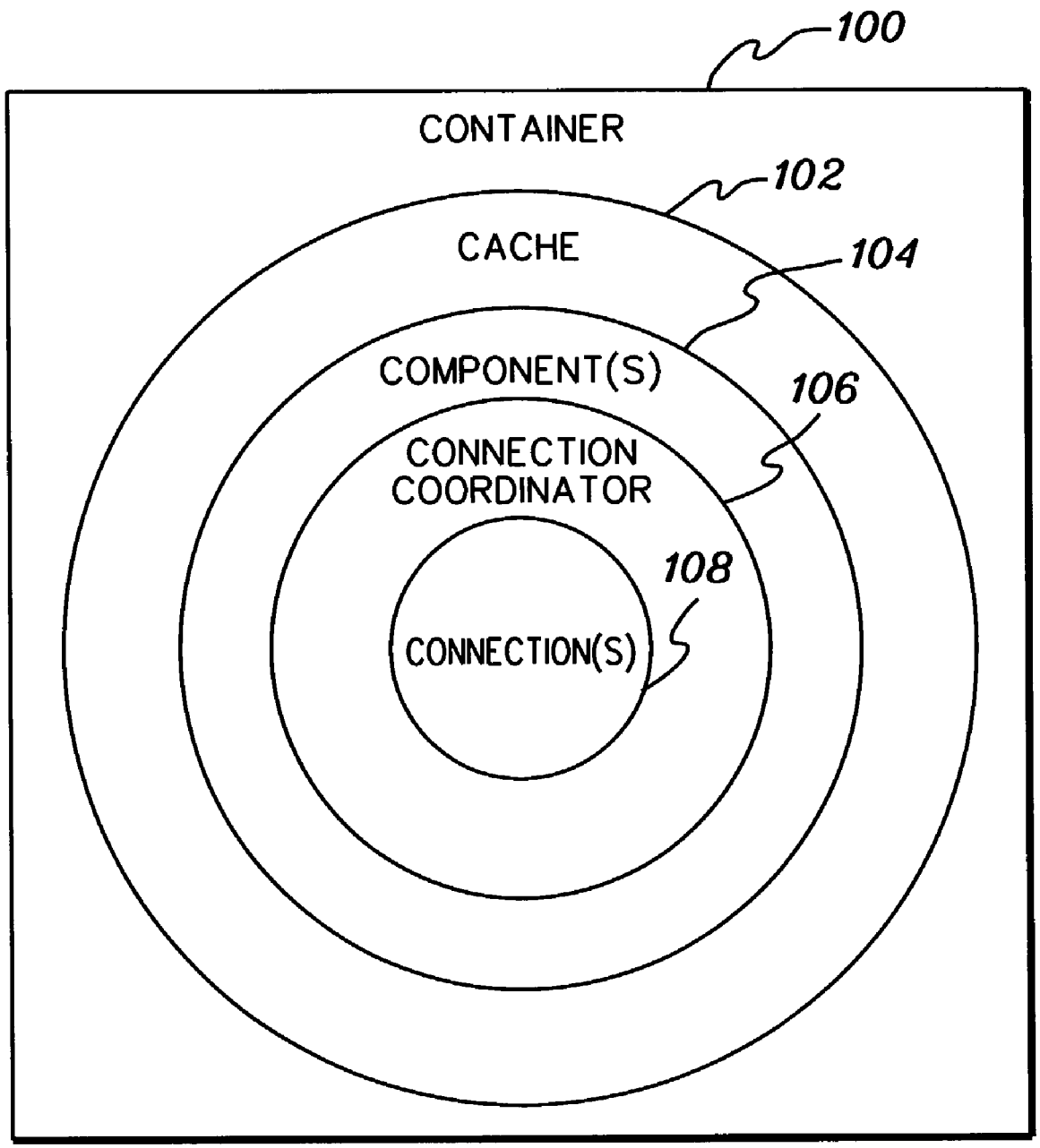
FIG. 1 depicts one embodiment of an environment incorporating and using one or more aspects of the present invention.

In the J2EE environment, components are managed by a container 100 (FIG. 1), such as a container within a J2EE server. Container 100 is used to provide lifecycle management, security, deployment, transaction management and runtime services to components. It also provides component-specific services.

Container 100 includes, for instance, a cache 102 that stores one or more components 104 (i.e., application components) to be accessed by one or more applications. A component can include, for instance, enterprise beans, such as session, entity or message-driven beans, web components, applets and/or application clients. Each component 104 includes, for instance, a reference to a unique instance of a connection coordinator 106. The connection coordinator is an object that holds for its component instance one or more managed connections 108 obtained during the lifecycle of that instance.

Figure 2:
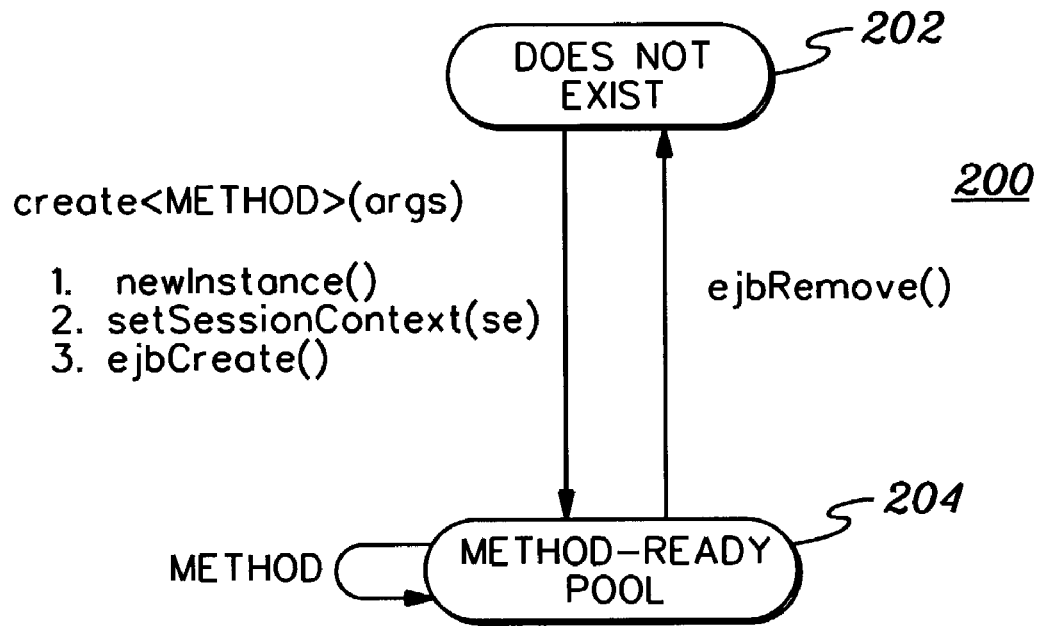
FIG. 2 depicts one example of a state diagram representing a lifecycle of a stateless session bean instance, in accordance with an aspect of the present invention.

Each component instance is driven through one or more states, depending on the architected lifecycle of that type of instance. As one example, the lifecycle of a component is represented by a state diagram. For example, a state diagram 200 representing a stateless session bean instance is depicted in FIG. 2 and described herein. With reference to FIG. 2, before the bean is created, it is in a state known as "Does Not Exist" 202. Then, when a client desires to create an instance of the bean, it invokes create, which causes the container to drive, for example, three framework methods: newInstance, setSessionContext, and ejbCreate. When the bean instance is created, it is in a state, referred to as "Method-Ready Pool" 204. In this state, methods are driven against the bean. When the bean instance is no longer needed, the container drives ejbRemove to transition the bean instance to the "Does Not Exist" state.

Figure 3:
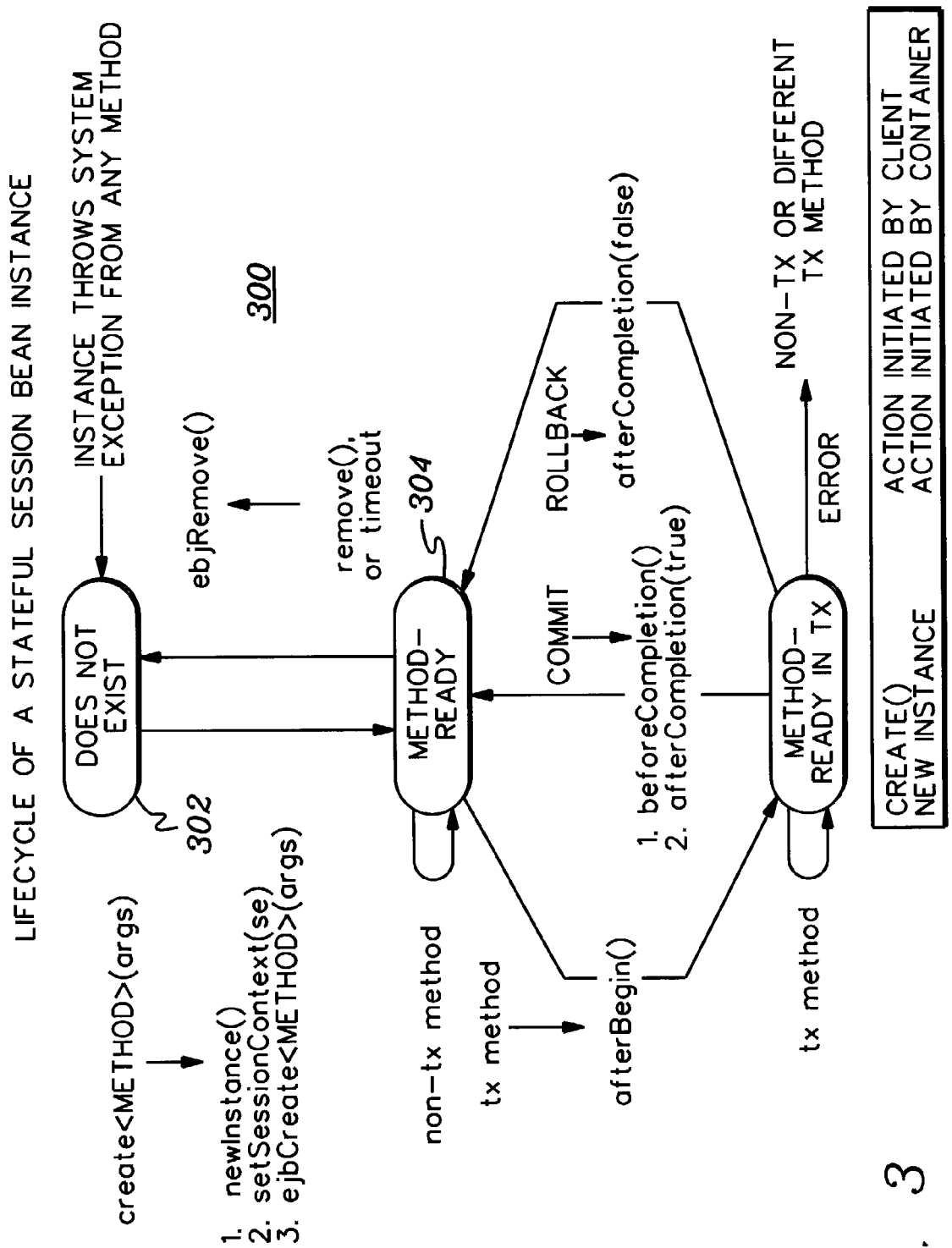
FIG. 3 depicts one example of a state diagram representing a lifecycle of a stateful session bean instance, in accordance with an aspect of the present invention.

Similarly, one example of a state diagram 300 representing the lifecycle of a stateful session bean instance is depicted in FIG. 3. Before the bean is created, it is in a state known as "Does Not Exist" 302. When a client desires to create the bean, it invokes create, which causes the container to drive, for example, three framework methods: newInstance, setSessionContext, and ejbCreate. When the bean instance is created, the bean is then in a state referred to as "Method-Ready" 304. In this state, methods are driven against the bean. For example, for a non-transaction method, the method is executed and the state returns to the "Method-Ready" state. However, for a transaction method, the container drives an afterBegin method and the transaction transitions into a state, referred to as "Method Ready in Transaction (TX)". It stays at this state until the transaction is complete, either with a commit or a rollback. In either case, once the transaction is complete, the instance returns back to the "Method-Ready" state. When the bean is to be deleted or time runs out, the container drives ejbRemove, and the bean instance is transitioned to the "Does Not Exist" state.

Figure 4:
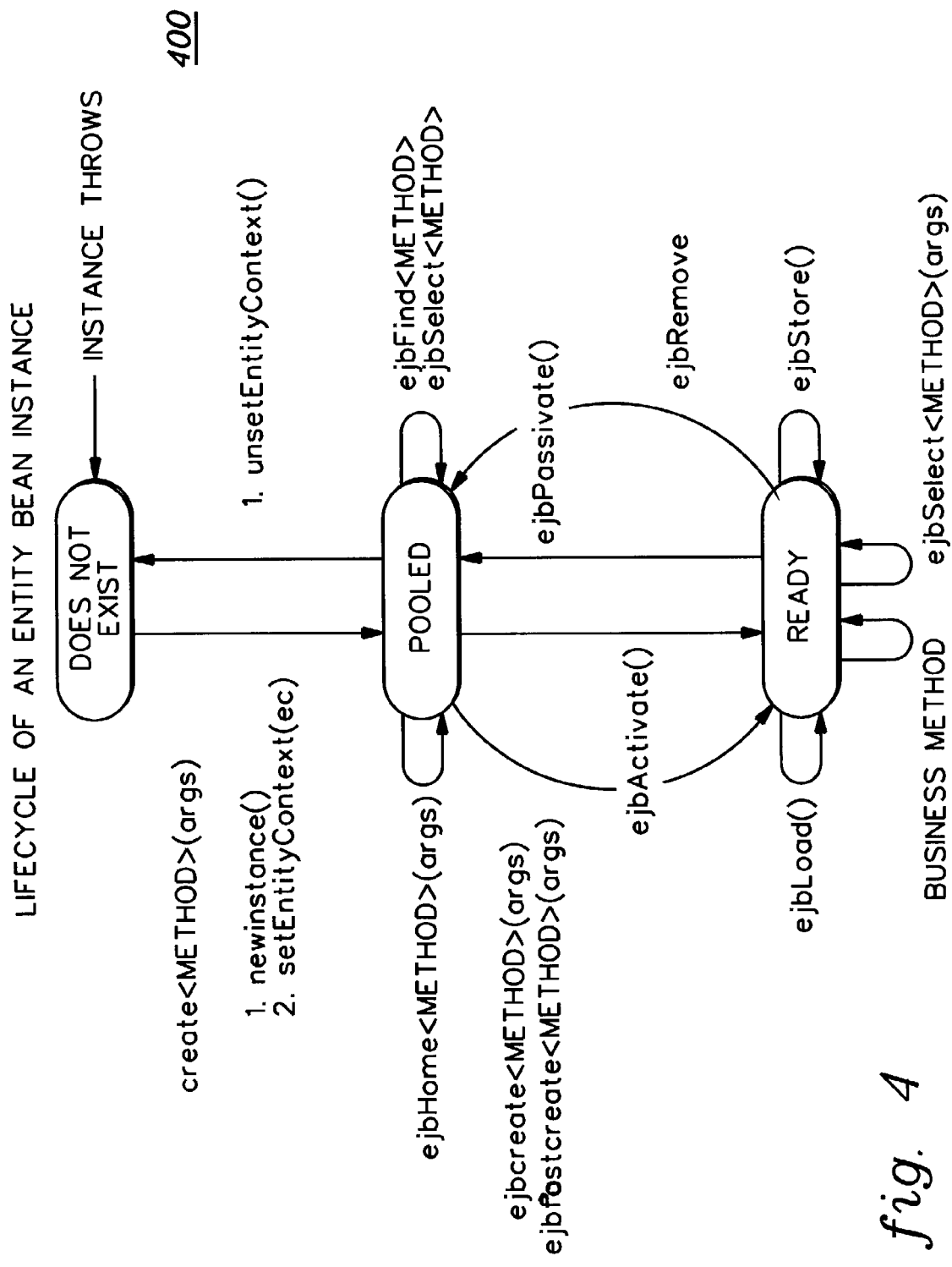
FIG. 4 depicts one example of a state diagram of a lifecycle of an entity bean instance, in accordance with an aspect of the present invention.
Figure 5:
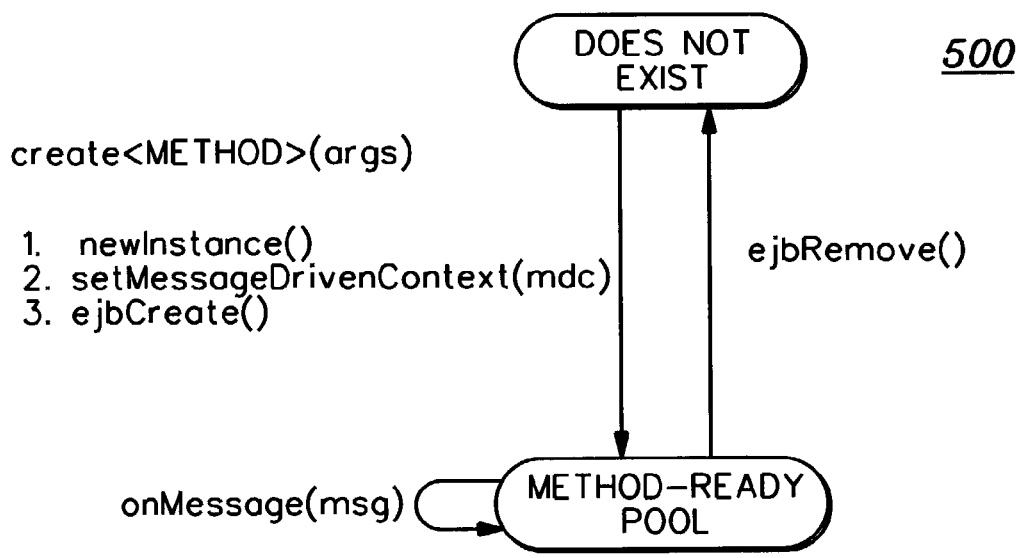
FIG. 5 depicts one example of a state diagram of a lifecycle of a message-driven bean instance, in accordance with an aspect of the present invention.

Other components have lifecycles associated therewith, which may also be represented by state diagrams. For example, a state diagram 400 representing the lifecycle of an entity bean instance is depicted in FIG. 4, and one example of a state diagram 500 representing a lifecycle of a message-driven bean instance is depicted in FIG. 5. Although, various states are depicted in the state diagrams described herein, these are only examples. Other states may be possible for the components depicted. Further, other types of representations are possible. Moreover, other components may have lifecycles associated therewith that are representable by similar state diagrams or other representations, and these are considered a part of the claimed invention.

A component uses one or more resources during its processing. Examples of those resources are connections, which represent access channels to physical resources owned by or outside of a container, such as a container within a J2EE server. These connections are used by the componentry to access back-end resource managers, like a relational database manager, message broker, or legacy application server. A connection that is open represents one or more levels of resource consumption.

A connection is created by, for example, using an indirect method, such as the Java Naming and Directory Interface (JNDI), to obtain a factory to create the connection. In particular, an application, such as a J2EE application, uses JNDI to perform a look-up to obtain a reference to a managed J2EE connection factory. This look-up returns a reference to a connection factory for which can be obtained a connection to a back-end resource manager (e.g., DB2, CICS, IMS, MQ). The back-end resource may or may not have a limited number of connections to any given instance of a server for which the datasource is configured. This method of deployment allows the user to insulate the application from installation specifics, like Internet Protocol (IP) address and port number of the installed resource manager.

The purpose of the connection factory object that is returned is to provide a connection object which implements a resource-specific interface type. For example, look-ups of JDBC DataSources return an object contracted to implement an interface named javax.sql.DataSource. The application is relieved of having to know the specific class name that provides that implementation. This allows the system to provide various polymorphic implementations of the connection objects in a way that is transparent to the component. This also allows the connection object implementations provided by the resource managers to be extended and augmented with behavior specific to the container. In this way, wrappers can be employed to extend the connection object by providing hook points to enable other container related tasks to be performed, such as tracking of the connections.

As is known, a wrapper is an object that encapsulates and delegates to another object to alter its interfaces or behavior in some way. A wrapper includes the same method signatures, as the interface being called and it can be interposed for various objects, such as connections, connection factories and other resources. In this example, a wrapper is inserted that implements the javax.sql.DataSource, and enables connection uses, e.g., getConnection requests, to be tracked and monitored, as described below. Connections that are obtained by the container mechanisms on behalf of the component can therefore be associated to the component and managed as part of the state transitions of the component.

Tracking of connections opened by a given instance of a component allows the container to take an aggressive role in ensuring that resource-intensive connections are reclaimed, as soon as possible. This is accomplished by, for instance, assigning a policy to the connections.

For example, during the look-up process, a connection policy is associated with resources of the application, such that connections created by the factory have either a normal or aggressive management policy, as examples. A J2EE application is comprised of one or more managed components. The installation sets the policy, when it deploys the components of the application. The policy is associated with connection resources that are obtained by a particular instance of a component from a connection factory using XML description tags, as one example. These tags denote whether or not connections obtained from a particular connection factory by a particular component should be aggressively managed. When a component obtains a connection, the policy associated with the connection from this connection factory is logged with the instance.

For those connections that represent scarce resources, an aggressive policy is assigned to a given component's usage of connections, directing the container to take aggressive action to reclaim the resources backed by the connections. In accordance with an aspect of the present invention, this is accomplished by forcing a component to transition from one state to another state, referred to herein as a reclaim state, and then reclaim the resources. There are framework methods on the component for which the container is obligated to call to transition the components through some of the lifecycle states. The events that trigger the framework methods to be driven are generated within the province of the container and the componentry is obligated to honor the state change. For those connections configured with aggressive policy, the components can be driven to a state, which is appropriate to reclaim the connections, so long as the appropriate framework methods are invoked. This allows the container to force the component into a state for which connections should have been returned by the component itself.

In one embodiment, the state in which the decision is made as whether to be aggressive or not (referred to as the decision state) is based on the component itself. Different components may or may not have different decision states. Several examples of decision states are described with respect to FIGS. 2–5. For example, in FIGS. 2 and 5, the "Method-Ready Pool" state is the decision state for the stateless session bean instance and the message-driven bean instance, respectively. At that state, the container determines whether aggressive management should be applied, and if so, it drives an ejbRemove to transition the component instance from the "Method-Ready Pool" state to the "Does Not Exist" reclaim state. Then, at the "Does Not Exist" state, any open connections can be reclaimed.

Similarly, in FIG. 3, the decision state for the stateful session bean instance is the "Method-Ready" state. As a further example, in FIG. 4, the decision state for the entity bean instance is the "Pooled" state.

Figure 6:
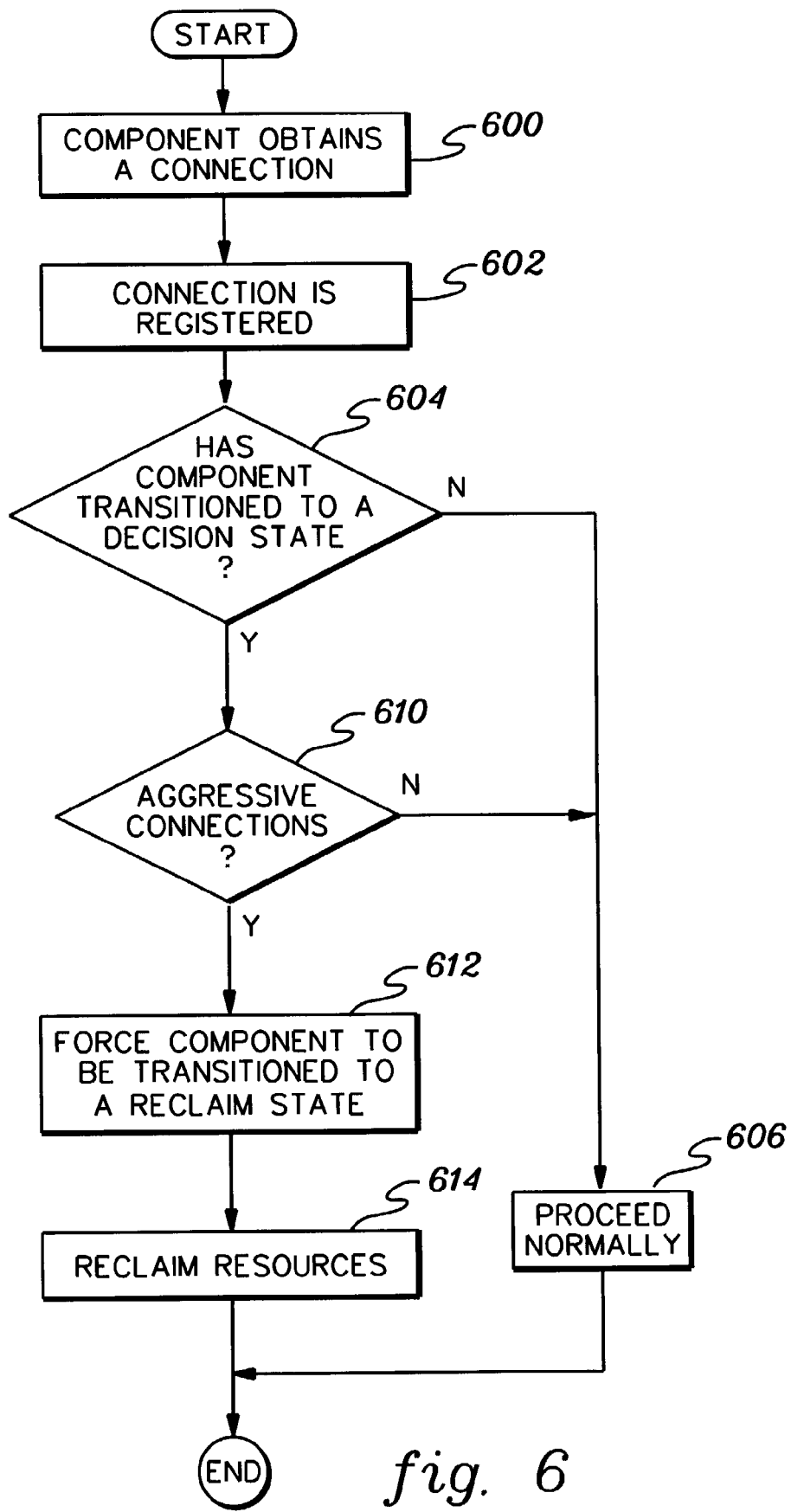
FIG. 6 depicts one embodiment of the logic associated with reclaiming resources, in accordance with an aspect of the present invention.

One embodiment of the logic associated with reclaiming resources in response to forced state transitions is described with reference to FIG. 6. Initially, a component instance, a shell of which resides in the container, obtains a connection, STEP 600. In one example, to obtain a connection, an application executing the component performs a JNDI lookup and is returned a wrapper. The application then invokes GetConnection, which calls a connection manager to obtain the connection. In one example, the connection manager is a specifically architected object of a J2EE server, that is separate from the container, but known by the container. The connection manager is known implicitly by the wrappers. The wrappers are agents of and delegate to the connection manager.

Subsequently, the connection is registered with a connection coordinator, in order to be able to track the connections of the component, STEP 602. In one example, to register the connection, the connection manager calls the container to obtain the connection coordinator for this particular instance of the component. The container returns to the connection manager identification of the connection coordinator, which is stored in the component, and then, the connection manager informs the coordinator of the connection and the policy associated therewith. The coordinator stores this information, thus, enabling the connections of this instance to be tracked.

Thereafter, during execution of the component, the component transitions from state to state. As it transitions, a determination is made, in accordance with an aspect of the present invention, as to whether it has transitioned to a state (e.g., a decision state) within its lifecycle in which the management policy is to be checked, INQUIRY 604. If the component has not transitioned to such a state, then processing proceeds, as before, STEP 606.

However, if the component has transitioned to a decision state, then a determination is made as to whether one or more connections have been deployed for this component that have an aggressive management, INQUIRY 610. For example, the coordinator is consulted to see if there are any connections that have been deployed for this component instance with an aggressive policy indication.

If there are no aggressive connections, then processing proceeds as normal, STEP 606. Otherwise, the container drives the component through the architected lifecycle of the component, forcing the component to reach the reclaim state, which in the examples herein is the "Does Not Exist" state, STEP 612. For instance, the container drives, at the decision state, an ejbRemove or unsetentityContext, as examples, forcing the component to transition to the reclaim state. Since it is the container forcing the component to the reclaim state, the forced reclaim is invisible to the application.

At this point, any resources that remain open for that component, as indicated by the coordinator, are reclaimed, STEP 614. It is possible that no resources remain open because the component had cleaned up its resources during normal processing. However, if the resources have not been cleaned up, then when the component is forced to this state, those resources will be cleaned up. In one example, this is accomplished by having the coordinator drive a destroy method on the reclaimed connection thus returning the resources to the server and resource manager. Thus, any aggressively managed resources are efficiently reclaimed.

Described in detail above is one embodiment for forcing a component to go from a state to a reclaim state in order to reclaim resources associated with that component. In one embodiment, the reclaim state is an existing state within the lifecycle of the component. The existing state has been extended in its behavior for additional resource management. This additional resource management is performed in such a way that is cooperative with the component, but transparent in terms of the existing programming model. Thus, changes to the architected programming model are avoided.

Advantageously, an aspect of this capability works within the rules of, for example, a J2EE environment, and further, it is invisible to the component and/or one or more other components of the application. It is invisible/transparent to the implementation of the component and it is transparent to other application components that may be using it. Using an aspect of this capability, the application sees normal end of lifecycle management, and does not experience any errors using a connection that was ripped out from underneath it, like using a timeout reclamation. The application that has a connection timed-out will experience various processing exceptions relating to using the now stale connection. This causes the application/component author to consider what to do with a stale connection exception any time the connection is used. With one or more aspects of the present invention, the component or application simply knows that states have changed and not why. It does not receive errors.

Although one example of a technique used to determine when to take aggressive action is described above, many techniques can be used to determine when the container should take aggressive action. This allows, for example, for the insertion of heuristics to dynamically decide whether the components should be transitioned to the reclaim state based on a known runtime state, such as the number of remaining connections available to the back-end resource and as such, defer connection reclamation until such time as those resources reach a dangerous level. This provides a reclaim as needed mechanism that is also invisible to the component, and allows for a clean non-intrusive mechanism for the application server to manage resources.

In addition to the above, if connections are shared, one or more aspects of the invention are still applicable, since the container is able to manage those shared connections using wrappering technology and the connection coordinator.

Although various systems and environments have been described above, these are only examples. One or more aspects of the present invention can be used with other types of systems, other platforms and/or other environments. Additionally, one or more aspects of the present invention can be used with different types of components, particularly, any component that has a defined lifecycle.

Moreover, although the embodiments described herein are with respect to connections, one or more aspects of the invention are equally applicable to other resources, such as resources used by connections, storage, sockets, file handles, semaphores and locks.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of reclaiming resources, said method comprising:
   determining whether a component of an application is to be forced to transition from one state to a reclaim state, said determining being based upon a management policy assigned to a connection used by the component;
   forcing the component to transition from the one state to the reclaim state to reclaim the connection used by the component, in response to the determining; and
   reclaiming the connection, in response to the forcing;
   wherein the determining occurs at a decision state within a lifecycle of states of said component, and wherein said forcing comprises forcing said component from the decision state to the reclaim state, in response to the determining.

2. The method of claim 1, further comprising assigning the management policy to the connection, the management policy being selected from multiple policies assignable to the connection, and wherein the forcing is managed based upon the management policy assigned.

3. The method of claim 1, wherein the state of a component that is the decision state depends on the component.

4. The method of claim 1, wherein said determining comprises dynamically determining, based upon the management policy assigned to the connection, whether said forcing is to occur.

5. A system of reclaiming resources, said system comprising:
   means for determining whether a component of an application is to be forced to transition from one state to a reclaim state, the determining being based upon a management policy assigned to a connection used by the component;
   means for forcing the component to transition from the one state to the reclaim state to reclaim the connection used by the component, in response to the determining; and
   means for reclaiming the connection, in response to the forcing;
   where in the determining occurs at a decision state within a lifecycle of states of said component, and wherein said means for forcing comprises means for forcing said component from the decision state to the reclaim state, in response to the determining.

6. The system of claim 5, further comprising means for assigning the management policy to the connection, the management policy being selected from multiple policies assignable to the connection, and wherein the forcing is managed based upon the management policy assigned.

7. The system of claim 5, wherein the state of a component that is the decision state depends on the component.

8. The system of claim 5, wherein said means for determining comprises means for dynamically determining, based upon the management policy assigned to the connection, whether the forcing is to occur.

9. At least one program storage device readable by a machine tangibly embodying at least one program of instructions executable by the machine to perform a method of reclaiming resources, said method comprising:
   determining whether a component of an application is to be forced to transition from one state to a reclaim state, said determining being based upon a management policy assigned to a connection used by the component;
   forcing the component to transition from the one state to the reclaim state to reclaim the connection used by the component, in response to the determining;
   reclaiming the connection, in response to the forcing; and
   assigning the management policy to the connection, the management policy being selected from multiple policies assignable to the connection, and wherein the forcing is managed based upon the management policy assigned.

10. At least one program storage device readable by a machine tangibly embodying at least one program of instructions executable by the machine to perform a method of reclaiming resources, said method comprising:
    determining whether a component of an application is to be forced to transition from one state to a reclaim state, said determining being based upon a management policy assigned to a connection used by the component;
    forcing the component to transition from the one state to the reclaim state to reclaim the connection used by the component, in response to the determining; and
    reclaiming the connection, in response to the forcing;
    wherein the determining occurs at a decision state within a lifecycle of states of said component, and wherein said forcing comprises forcing said component from the decision irate to the reclaim state, in response to the determining.

11. The at least one program storage device of claim 10, wherein the state of component that is the decision state depends on the component.

12. The at least one program storage device of claim 10, wherein said determining comprises dynamically determining, based upon the management policy assigned to the connection, whether said forcing is to occur.

* * * * *